United States Patent [19]

Senba et al.

[11] Patent Number: 5,037,154
[45] Date of Patent: Aug. 6, 1991

[54] LOCKABLE COVER ARRANGEMENT FOR VEHICLE LUGGAGE COMPARTMENT

[75] Inventors: Ryoji Senba; Shumei Fujita, Toyota; Fumio Sugiura, Aichi, all of Japan

[73] Assignee: Toyota Jidosha Kabushiki Kaisha, Japan

[21] Appl. No.: 627,917

[22] Filed: Dec. 17, 1990

Related U.S. Application Data

[63] Continuation of Ser. No. 940,181, Dec. 5, 1986, abandoned, which is a continuation of Ser. No. 693,989, Jan. 23, 1985, abandoned.

[30] Foreign Application Priority Data

Feb. 23, 1984 [JP] Japan ............................ 59-24932[U]

[51] Int. Cl.$^5$ ................................................ B60R 5/04
[52] U.S. Cl. ................................. 296/37.16; 296/37.1
[58] Field of Search .................... 296/37.1, 37.8, 37.16, 296/76, 65.1; 292/107, 209, 216, 304

[56] References Cited

U.S. PATENT DOCUMENTS

| | | | |
|---|---|---|---|
| 2,742,309 | 4/1956 | Hillgren | 292/107 X |
| 3,065,985 | 11/1962 | DuFour | 292/107 X |
| 3,433,524 | 3/1969 | Close | 296/65 R |
| 3,666,314 | 5/1972 | Makinen et al. | 296/65 R X |
| 3,973,799 | 8/1976 | Berg | 296/65 R X |
| 4,073,534 | 2/1978 | Hira | 296/76 X |
| 4,277,097 | 7/1981 | Lalanne | 296/37.16 |
| 4,286,819 | 9/1981 | Inoue et al. | 296/65 R |
| 4,351,555 | 9/1982 | Hashimoto | 296/37.16 |
| 4,366,978 | 1/1983 | Hamatani | 296/37.16 X |
| 4,479,675 | 10/1984 | Zankl | 296/37.16 |

FOREIGN PATENT DOCUMENTS

| | | | |
|---|---|---|---|
| 2840068 | 3/1979 | Fed. Rep. of Germany | 296/37.16 |
| 0126719 | 8/1982 | Japan | 296/37.16 |

OTHER PUBLICATIONS

1983 Toyota Celica Owner's Manual, Publication No. 3741A, p. 38 only.

*Primary Examiner*—Russell D. Stormer
*Attorney, Agent, or Firm*—Oliff & Berridge

[57] ABSTRACT

A vehicle body structure having a lock device for use of a package tray installed in a vehicle. A package tray is provided within a luggage compartment to conceal a luggage from the outside. In a two box car, a luggage compartment is communicated with a passenger compartment. Hence, even if a hatch back door is closed and locked, a luggage put in a luggage compartment might be stolen if a front or rear door is opened. The lock device makes the package tray locked, thereby disconnecting the communication between the passenger compartment and the luggage compartment.

17 Claims, 9 Drawing Sheets 5,037,154

LOCKABLE COVER ARRANGEMENT FOR VEHICLE LUGGAGE COMPARTMENT

This is a continuation of application Ser. No. 06/940,181 filed Dec. 5, 1986 which is in turn a continuation application of Ser. No. 06/693,989 filed Jan. 23, 1985, both of which are now abandoned.

BACKGROUND OF THE INVENTION

The present invention relates to a vehicle body structure, and more particularly to a lock device for preventing a package tray from being opened by an accupant of a passenger compartment.

In a vehicle in which a luggage compartment separate from a passenger compartment is not provided, such as a so-called two box car, a space defined behind rear seats is employed as a luggage compartment. In most of such vehicles, a package tray, which can be opened, is provided in a luggage compartment to conceal luggage located in the luggage compartment from the outside.

These vehicles are equipped with a hatch back door which can be opened. When a passenger loads or unloads luggage from the luggage compartment, a hatch back door is upwardly opened to permit loading or unloading of luggage. To easily load or unload luggage from the luggage compartment, a package tray is designed to have a rear end which is connected with a hatch back door by a rubber belt etc., and to tilt around its front axis when the hatch back door is opened. This tilt enables the luggage compartment through which luggage is loaded or unloaded to be opened.

Further, to enable the loading or unloading of luggage from the passenger compartment, some of the above-described vehicles have package trays which can tilt around their rear shafts.

In all the above-described vehicles, the luggage compartment communicates with the passenger compartment even when the hatch back door is closed and locked. Hence, luggage loaded in a luggage compartment can be stolen when a front or rear door is opened.

SUMMARY OF THE INVENTION

The present invention was developed in view of the foregoing background and to overcome the foregoing drawbacks. It is accordingly an object of this invention to provide a vehicle body structure having a package tray in a luggage compartment which conceals luggage from the outside, and which locks the package tray onto the vehicle body, thereby preventing the package tray from being opened from the passenger compartment.

To attain the above objects, the vehicle body structure according to the present invention has a package tray provided in a luggage compartment defined behind a rear seat. The package tray is mounted on a vehicle body. A lock means is provided between the package tray and the vehicle body. The lock means fixes the package tray onto the vehicle body, thereby preventing communication between a passenger compartment and the luggage compartment. The package tray is locked by the lock means onto the vehicle body.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
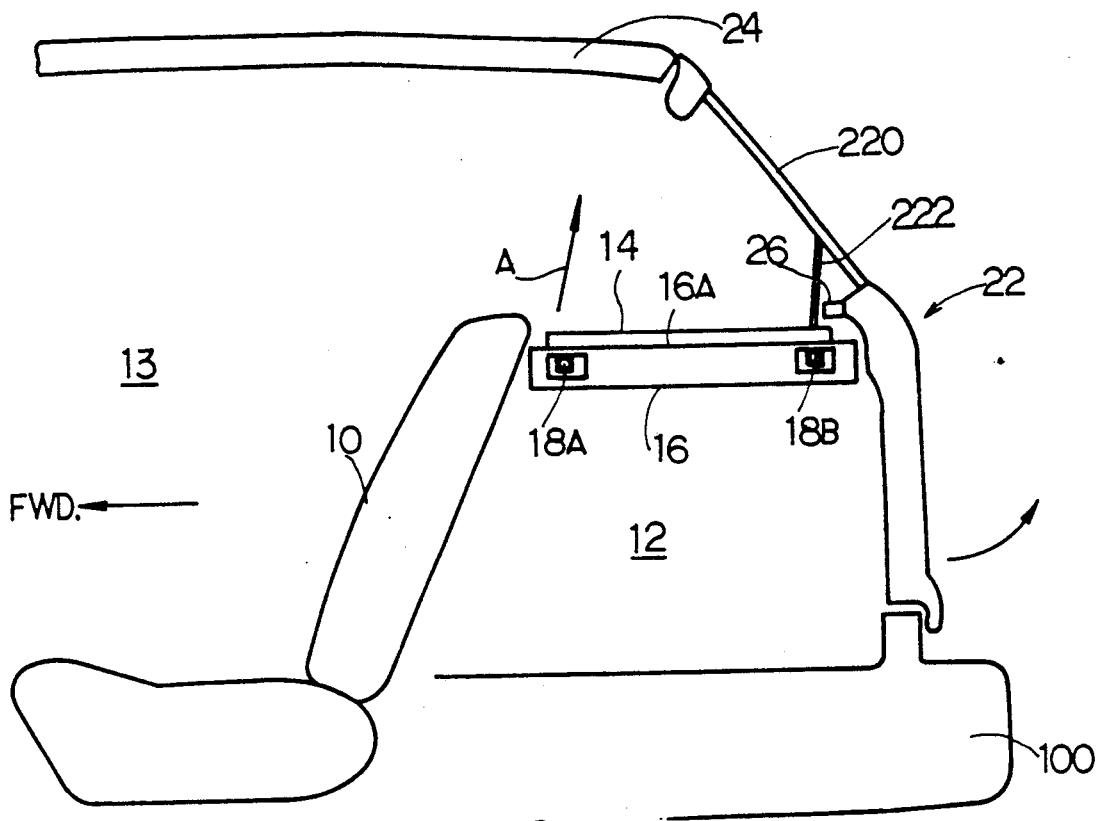
FIG. 1 is a cross-sectional view illustrating a luggage compartment in which a lock device according to the present invention is applied.

FIG. 1 shows a cross-sectional view illustrating a luggage compartment in which a lock device according to the first embodiment of the present invention is employed. A luggage compartment 12 is provided behind a seat back 10 of a rear seat. A package tray 14 is located in the luggage compartment 12 and is mounted on a bracket 16 which is fixed onto a vehicle body. The package tray 14 includes a pair of pins 18A and 18B at its front sides and rear sides, respectively. These pins 18A and 18B are supported by the bracket 16. The intermediate side portions of the package tray 14 between the front and rear pins 18A and 18B, are mounted on stepped portions 16A of the bracket 16.

A hatch back door 22 is mounted on a rear edge portion of a roof 24 such that the hatch back door 22 may be tilted around the rear edge portion of the roof 24. When the hatch back door 22 opens, an opening is defined above a bumper 100. A rear window 220 is connected with the rear edge of the package tray 14 by a cord 222. A stopper 26 is provided on an interior of the hatch back door 22. The stopper 26 is located above the top surface of the rear edge portion of the package tray 14 when the hatch back door 22 is closed.

In the vehicle shown in FIG. 1, the luggage is loaded or unloaded after the hatch back door 22 is opened. When the hatch back door 22 opens, the cord 222 lifts the rear edge of the package tray 14 and the package tray 14 moves according to the movement of the hatch back door 22 to be swung around the front pins 18A. Further, to lift the package tray 14 from a passenger compartment 13, a passenger lifts up the front edge of the package tray 14 and the package tray 14 is swung around the rear pins 18B. Hence, the passenger compartment 13 is in communication with the luggage compartment 12.

Figure 2:
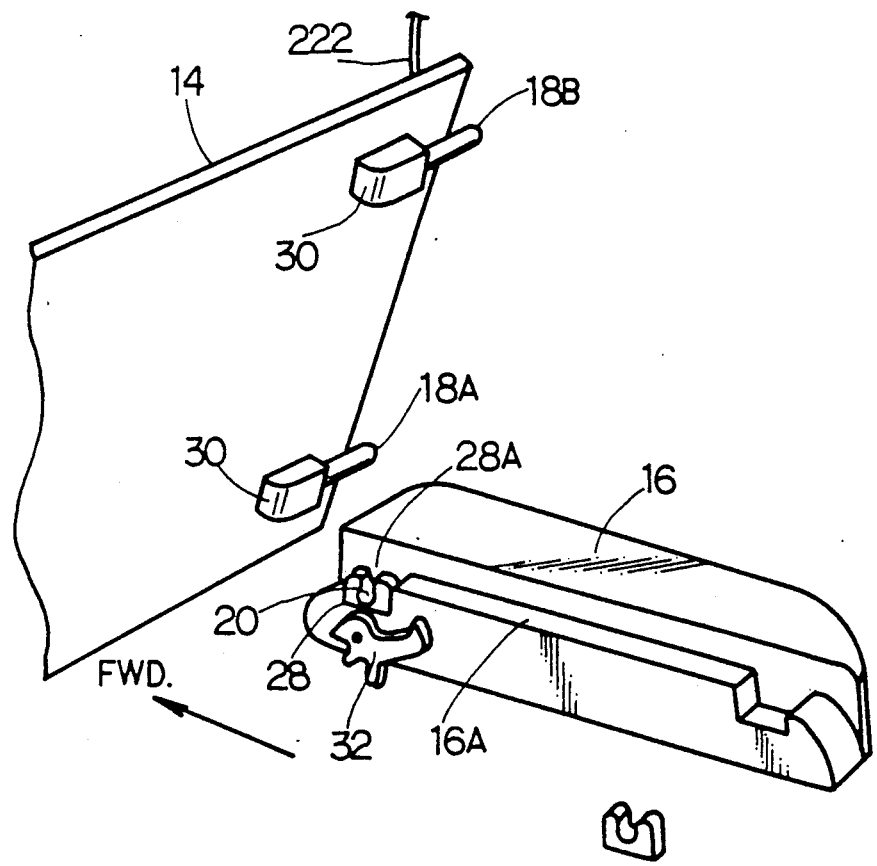
FIG. 2 is a perspective view illustrating a lock device according to a first embodiment of the present invention.
Figure 4:
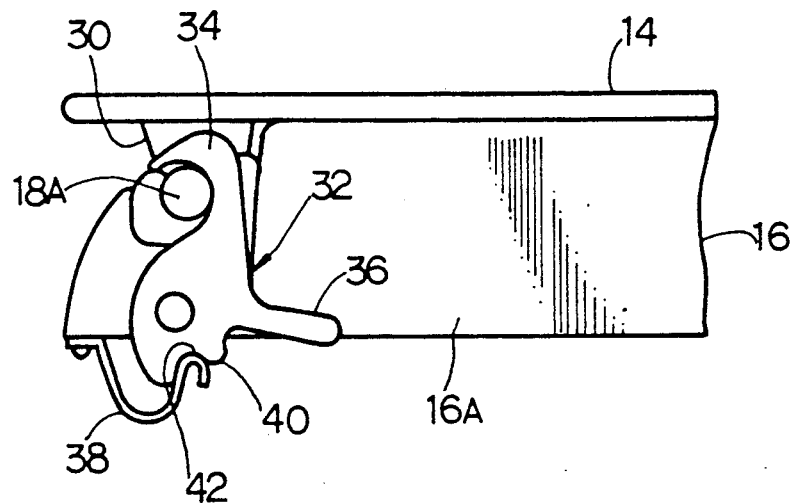
FIG. 4 is a partial cross-sectional view illustrating a lock device according to the first embodiment which is locked.

FIGS. 2 and 4 show a lock device according to a first embodiment of the present invention. One of the side edges of the bracket 16 is secured to the vehicle body. The stepped portion 16A is provided at another side edge of the bracket 16. A clamp 28 is fixed at the front portion of the stepped portion 16A. The clamp 28 has a concave portion 20 therein where the pin 18A is fitted and supported. The concave portion 20 has an upper aperture 28A which is positioned at a point under the top surface of the stepped portion 16A. The bottom surface of the package tray 14 contacts the stepped portion 16A, and hence the upper aperture 28A is positioned under the package tray 14. The clamp 28 is made of a plastic material which has resilient characteristics. The clamp 28 supports the pin 18A to be rotatable therein. The pin 18A is fixed onto the bottom surface of the package tray 14 at the front side edge portion through a fastener 30. When the package tray 14 is mounted on the stepped portion 16A, the pin 18A is provided at the position where it is separate from the bottom surface of the package tray 14. The pin 18A can be engaged with the clamp 28 when the bottom surface of the package tray 14 contacts the stepped portion 16A.

A ratch 32 is rotatably mounted on a side part of the stepped portion 16A of the bracket 16. The ratch 32 is positioned under the clamp 28. The ratch 32 is made of a sheet of metal, and is stamped out from a sheet of metal. The ratch 32 comprises a hook 34 which encircles almost half the periphery of the pin 18A when the hook 34 is rotated to lock the pin 18A, a lever 36, and a projection 40 on which oen end of a cantilever plate spring 38 contacts with its bias force.

Figure 3:
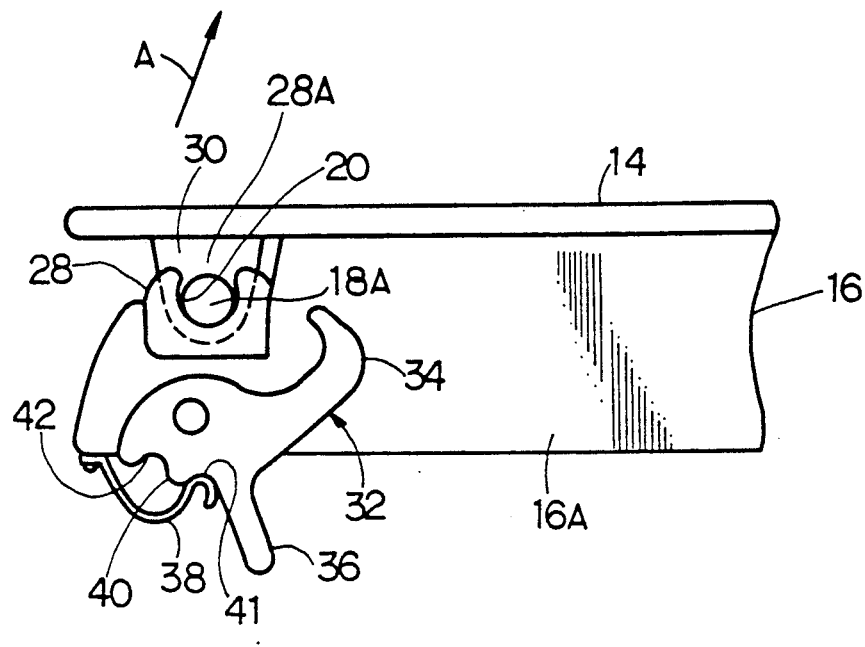
FIG. 3 is a partial cross-sectional view illustrating a lock device according to the first embodiment which is unlocked.

When the ratch 32 is in the unlocked condition as shown in FIG. 3, the curved tip end of the plate spring 38 contacts a concave portion 41 of the ratch 32, and the hook 34 is separate away from the pin 18A. When a passenger lifts the package tray 14 from the passenger compartment 13, the package tray 14 is lifted in the direction indicated by the reference "A" in FIG. 3. When the lever 36 is rotated in the counterclockwise direction from the position shown in FIG. 3, the ratch 32 rotates and the plate spring 38 moves over the projection 40 to contact a left concave portion 42 as shown in FIG. 4. In this condition, the hook 34 oves to the side of the clamp 28. The tip end of the hook 34 moves to the side of the clamp 28 to close the aperture 28A. This prevents the pin 18A from separating from the clamp 28. In this arrangement, the package tray 14 is locked. Hence, a passenger in a passenger compartment 13 cannot open the package tray 14. When the lever 36 is rotated in the clockwise direction from the position shown in FIG. 4, the package tray 14 is unlocked as shown in FIG. 3.

In operation of the lock device according to the first embodiment, when the pin 18A is in the unlocked condition as shown in FIG. 3, the package tray 14 can rotate around the pin 18A or 18B. When a passenger opens the hatch back door 22, the package tray 14 is rotated around the pin 18A by the cord 222 connecting the hatch back door 22 with the package tray 14. Further, a passenger in a passenger compartment 13 can lift the package tray 14 so that it rotates around the pin 18B. Thus, when the package tray 14 is rotated around the pin 18A or 18B, the luggage compartment 12 is opened.

To lock the package tray 14, a passenger opens the hatch back door 22 thereby rotating the package tray 14 around the pin 18A to lift the package tray 14. Next, the passenger rotates the lever 36 in the counterclockwise direction from the position shown in FIG. 3 to the position shown in FIG. 4. Subsequently, the passenger closes the hatch back door 22 and the package tray 14 is returned to the closed position. In this condition, the package tray 14 cannot be rotated around the pin 18A, thus a passenger cannot open the package tray 14 from the passenger compartment 13. Further, if the hatch back door 22 is locked, the package tray 14 cannot be rotated around the pin 18B by means of the stopper 26, thereby completely locking the package tray 14.

Figure 5:
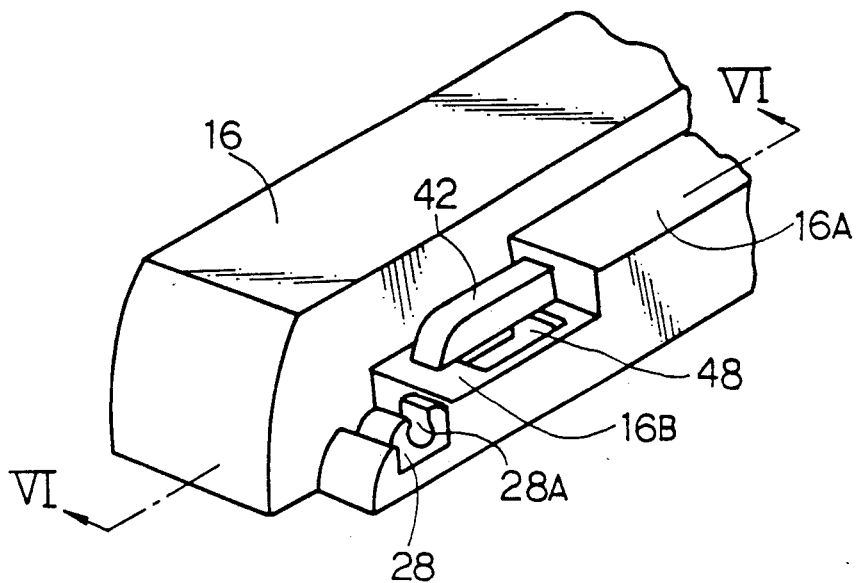
FIG. 5 is a perspective view illustrating a lock device according to a second embodiment of the present invention.
Figure 6:
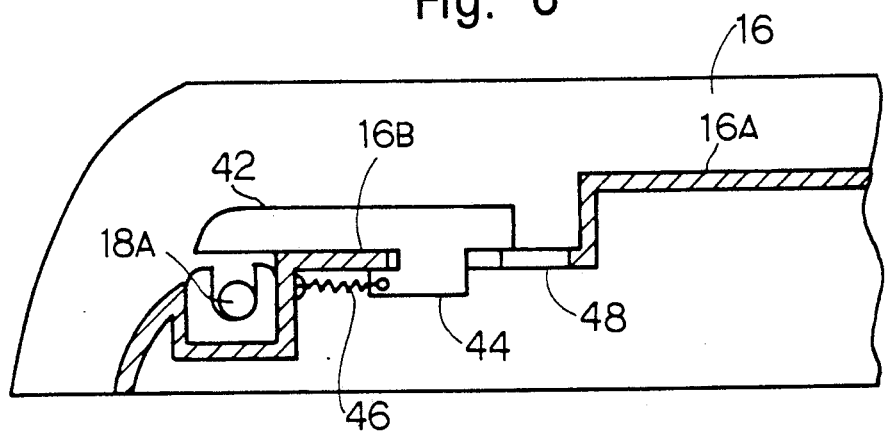
FIG. 6 is a side view illustrating a lock device according to the second embodiment of the present invention.
Figure 7:
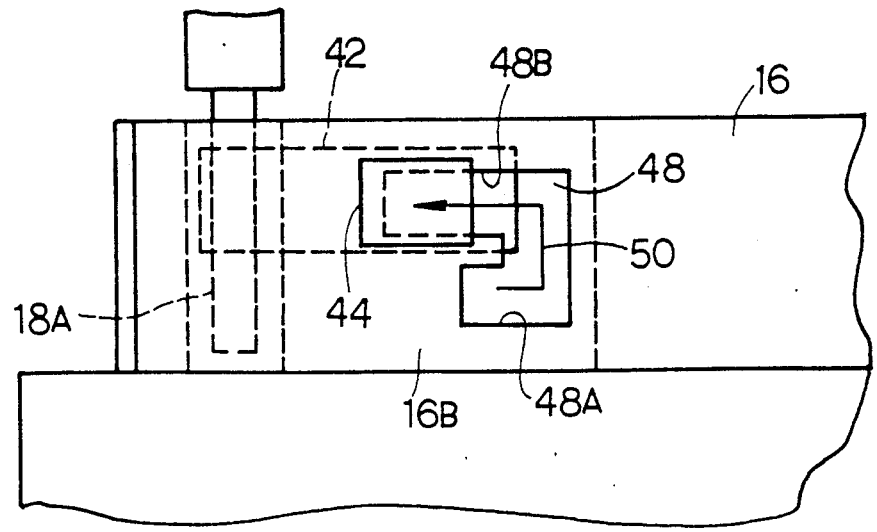
FIG. 7 is a bottom view illustrating a lock device according to the second embodiment of the present invention.
Figure 8:
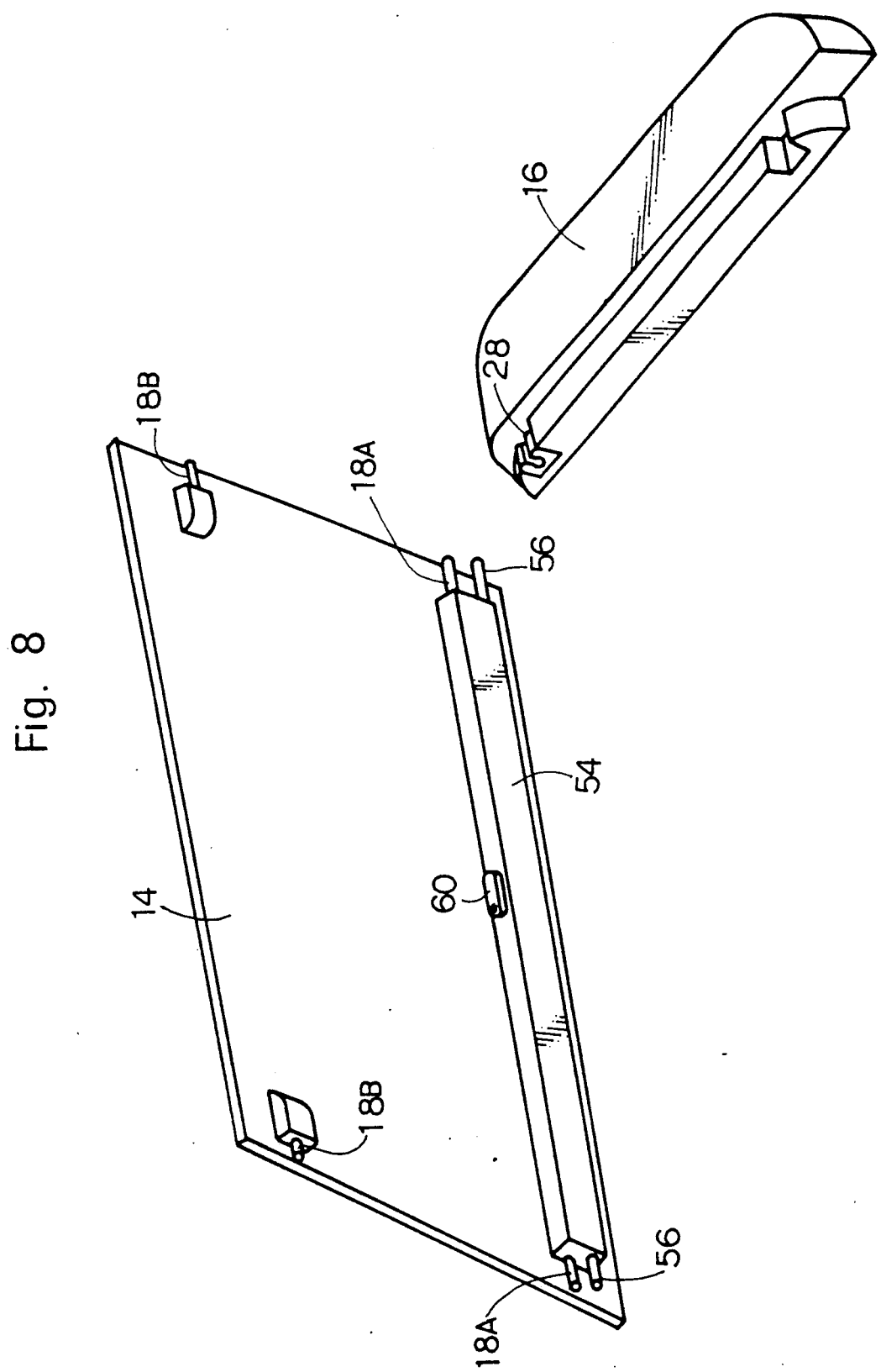
FIG. 8 is a perspective view illustrating a lock device according to a third embodiment of the present invention.

FIGS. 5 to 7 show a lock device according to the second embodiment of the present invention. According to the second embodiment, the lock device is provided on a bracket 16 as in the first embodiment. A slider 42, having a shape similar to a rectangular parallelepiped, is disposed on a stepped portion 16B which is located in front of stepped portion 16A. The slider 42 has a guide member 44 therein which is connected with one end of a tension coil spring 46. The slider 42 is designed to slide freely on the stepped portion 16B by positioning the guide member 44 within the L-shaped guide hole 48.

When the lock device is unlocked, the guide member 44 of the slider 42 is positioned within an elongated hole 48A, and the guide member 44 contacts the end of the hole 48A as a result of the bias force of the tension coil spring 46. In this condition, the front end of the slider 42 is located at the position which is separate away from an aperture 28A of a clamp 28, as shown in FIG. 5. As shown in FIG. 7 by the line 50, when the slider 42 is moved rearwardly against the bias force of the coil spring 46, it can subsequently be moved toward another elongated hole 48B. When the guide member 44 of the slider 42 is positioned within the elongated hole 48B, the slider 42 forwardly slides on the stepped portion 16B from the bias force of the tension coil spring 46. As a result, the front end of the slider 42 moves into the position above the aperture 28A of the clamp 28, thereby closing the aperture 28A as shown in FIG. 6. Hence, the pin 18A is prevented from being removed from the clamp 28. This is a locked condition. If the slider 42 is moved in the opposite direction to that indicated by the line 50, the lock is released to be in the unlocked condition as shown in FIG. 5.

FIGS. 8 to 12 show a lock device according to the third embodiment of the present invention. According to the third embodiment, the lock device is provided on a package tray 14. In this third embodiment, a pin 18A, is fixed onto a housing 54. When the package tray 14 is mounted on a bracket 16, the pin 18A is positioned within the clamp 28. The housing 54 is mounted on the back of the package tray 14 and extends across the lateral direction of the vehicle.

Figure 9:
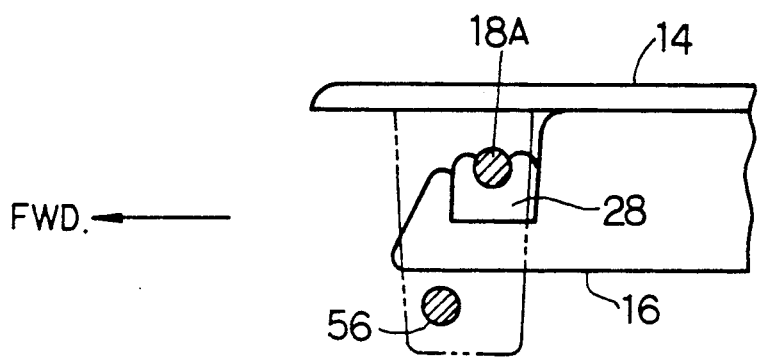
FIG. 9 is a partial side view illustrating a lock device according to the third embodiment of the present invention.
Figure 10:
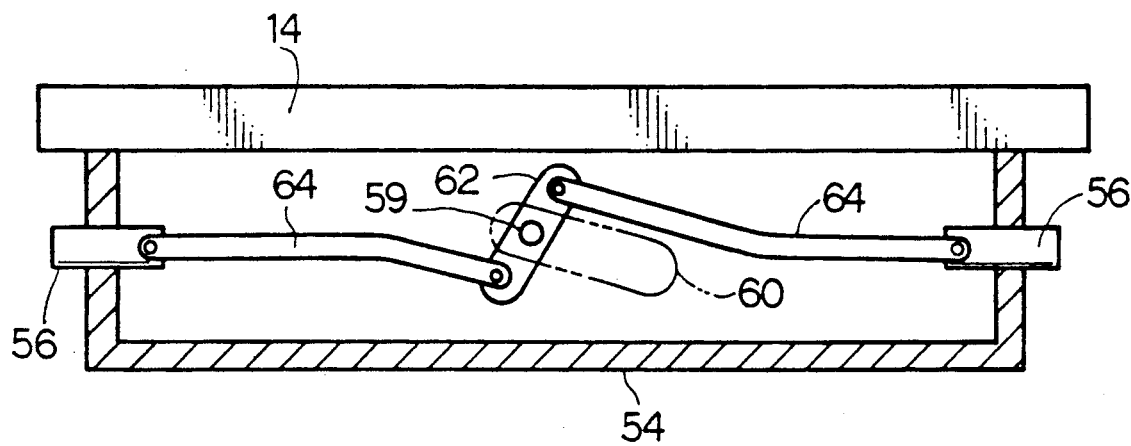
FIG. 10 is a side view illustrating a rocker arm which is employed in a lock device according to the third embodiment of the present invention.

A lock pin 56 is a shaft which is mounted in the housing 54 to extend from the both ends of the housing 54 is the direction parallel to the pins 18A. The lock pin 56, as shown in FIG. 9, is located in front of the pin 18A when the pin 18A is supported in the clamp 28. Further, the lock pin 56 is located under the bottom surface of the bracket 16. As shown in FIG. 10, a lever 60 is rotatably mounted by a pin 59 to the housing 54. A rocker arm 62 is fixed onto the pin 59. A pair of connection rods 64 are provided between the rocker arm 62 and the lock pins 56. The rod 64 is connected with one end of the rocker arm 62 at one end thereof and with the lock pin 56 at another end thereof. The lever 60 is rotated by a passenger.

Figure 11:
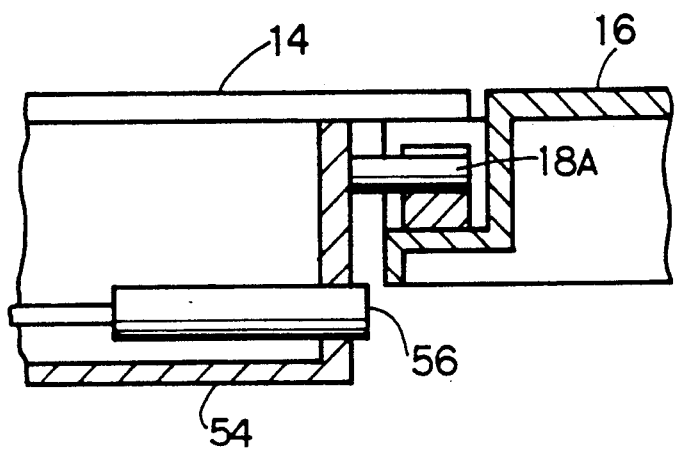
FIG. 11 is a partial cross-sectional view illustrating a lock device according to the third embodiment which is unlocked.
Figure 12:
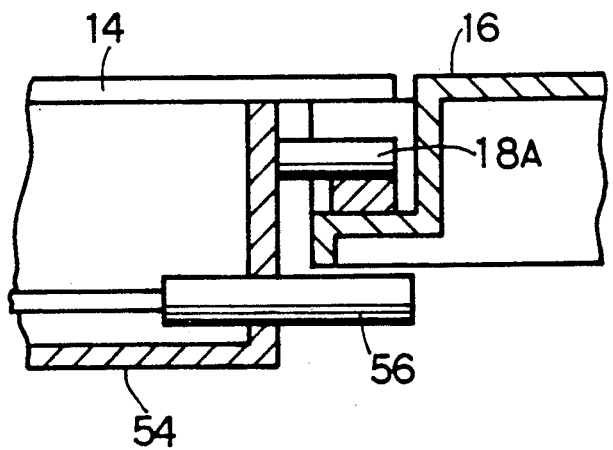
FIG. 12 is a partial cross-sectional view illustrating such a condition as a lock device according to the third embodiment is locked.

When the lock pin 56 is in the unlocked condition, most of the lock pin 56 is located within the housing 54, as shown in FIG. 11. When the lever 60 is rotated in the clockwise direction from the position shown in FIG. 10, the lock pin 56 protrudes from the housing 54 to be located under the bottom surface of the bracket 16 as shown in FIG. 12. In this condition, the pin 18A is prevented from being removed from the aperture 28A of the clamp 28. This is the locked condition. When the package tray 14 is in the locked condition, the package tray 14 cannot be rotated around the pin 18A. If the lever 60 is rotated in the counterclockwise direction from the position shown in FIG. 10, the package tray 14 is unlocked, and returns into the condition shown in FIG. 11.

Figure 13:
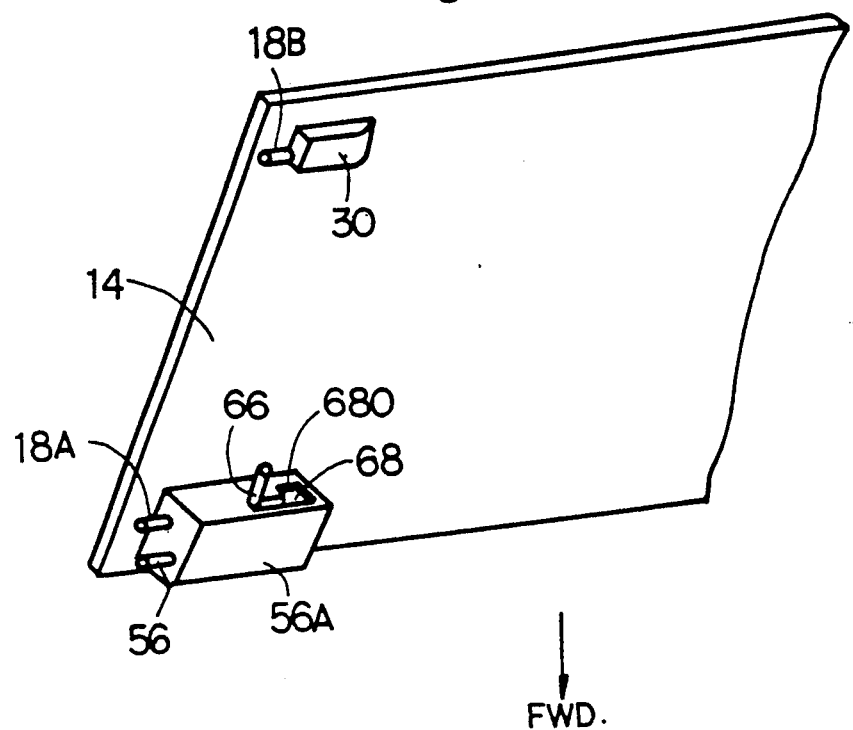
FIG. 13 is a perspective view illustrating a lock device according to a fourth embodiment of the present invention.

FIG. 13 shows a lock device according to a fourth embodiment of the present invention. This fourth embodiment is a modified embodiment of the third embodiment. According to the fourth embodiment, a pair of lock pins 56 are provided within housings 56A each of which is located at a lateral end of the package tray 14. In FIG. 13, one of the housings 56A is shown. Each lock pin 56 is connected with a lever 66 which is perpendicular to the lock pin 56. The housing 56A has a L-shaped guide hole 68 in which the lever 66 is movably guided. When the lever 66 is positioned in a short hole 680 of the guide hole 68, the lock pin 56 is maintained within the housing 56A. When the lever 66 is positioned in the short hole 680, the lock pin 56 protrudes from the housing 56A by a small length. This is the unlocked position. When the lever 66 is positioned a the long hole 68 as shown in FIG. 13, the lock pin 56 protrudes to. This is the locked position.

Figure 14:
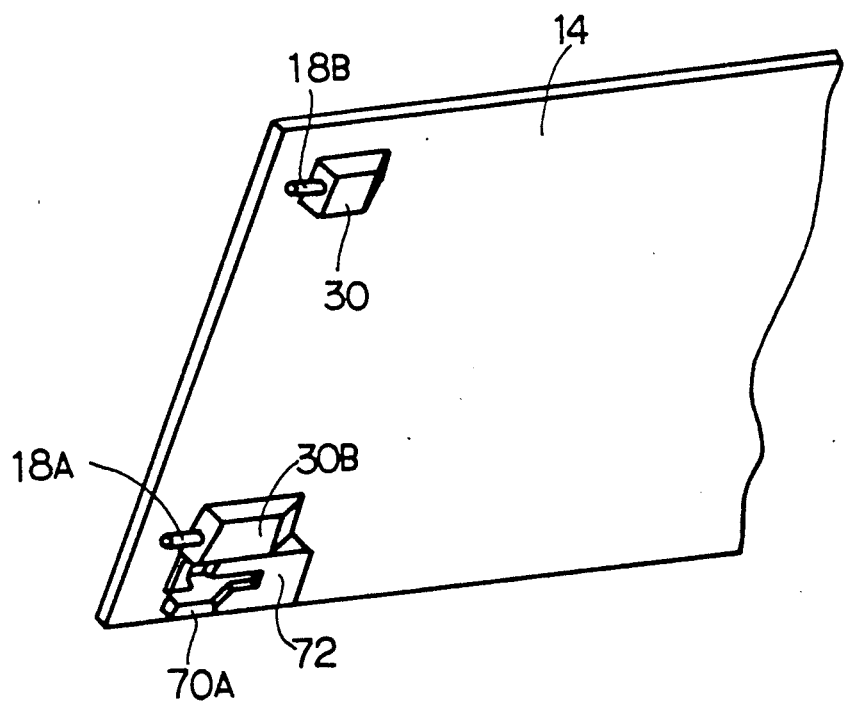
FIG. 14 is a perspective view illustrating a lock device according to a fifth embodiment of the present invention.
Figure 15:
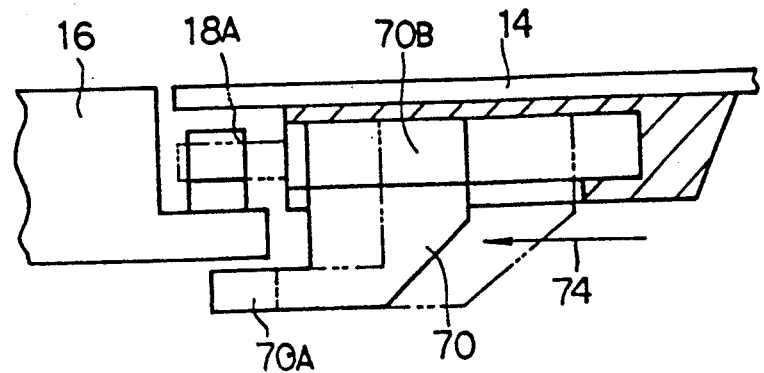
FIG. 15 is a partial cross-sectional view illustrating movement of a lock device according to the fifth embodiment.

FIGS. 14 and 15 show a lock device according to a fifth embodiment of the present invention. According to this fifth embodiment, the lock device is provided on a package tray 14, as in the fourth embodiment. A lock pin 70 has a general h-shaped form, and comprises a pin portion 70A and a guide portion 70B. The guide portion 70B of the lock pin 70 is fitted into a bracket 72 which is mounted on the package tray 14 at a position abutting against a holder 30B. The holder 30B mounts a pin 18A therein. The guide portion 70B of the lock pin 70 is guided by the bracket 72 such that the guide portion 70B can move in a direction almost parallel to the axial direction of the pin 18A.

When the lock pin 70 is in the unlocked condition, the lock pin 70 is located in the position indicated by the phantom line in FIG. 15. When the pin portion 70A of the lock pin 70 slides in the direction indicated by the numeral 74 shown in FIG. 15 from the position indicated by the phantom line in FIG. 15, the pin portion 70A is located in the position indicated by the solid line in FIG. 15. In this condition, the pin portion 70A of the lock pin 70 protrudes to the position which is under the bracket 16. This is the locked position. To unlock the package tray 14, the pin portion 70A slides in the direction opposite to the direction indicated by the numeral 74 in FIG. 15.

In the above lock device described above in its various embodiments, the locking and unlocking of the device is accomplished by opening the hatch back door 22.

In vehicles equipped with a rear window glass inclined at a large angle or in which a rear end of a package tray is located close to an interior surface of a hatch back door, the interior surface of the hatch back door functions as a stopper. Hence, a stopper 26 can be omitted.

Figure 16:
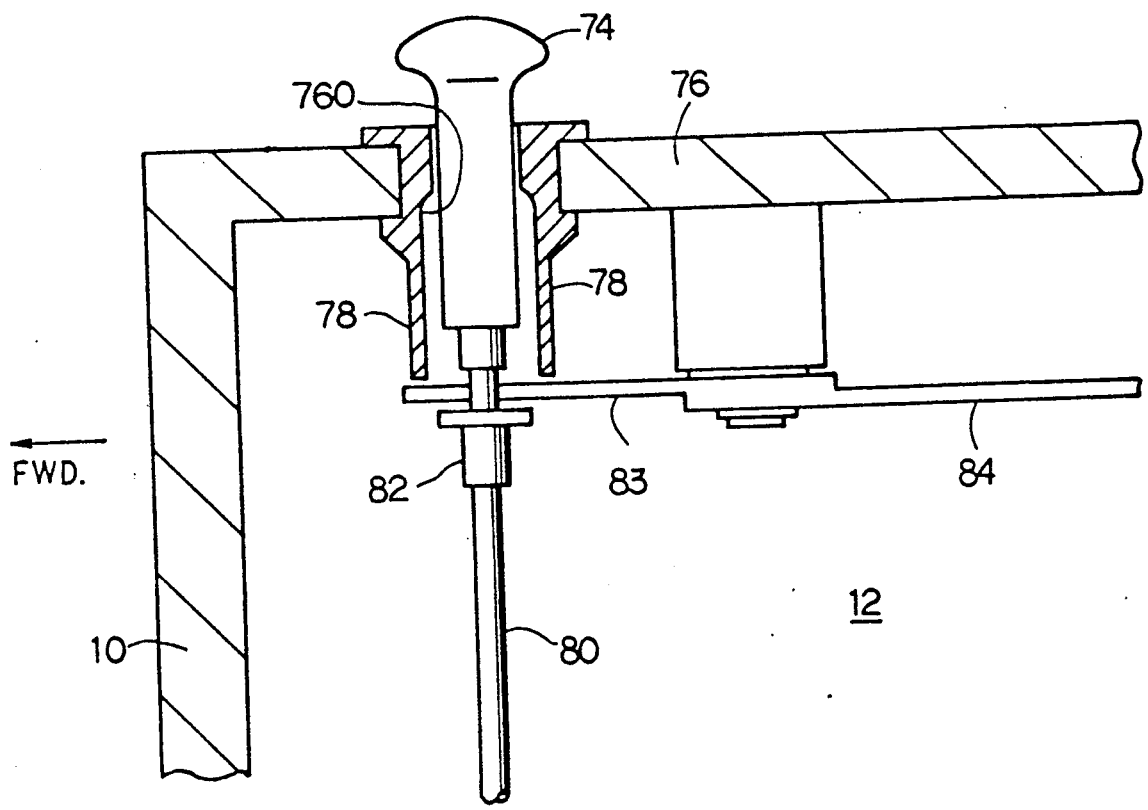
FIG. 16 is a cross-sectional view illustrating a mechanism which is employed to prevent a foldable rear seat from being folded.
Figure 17:
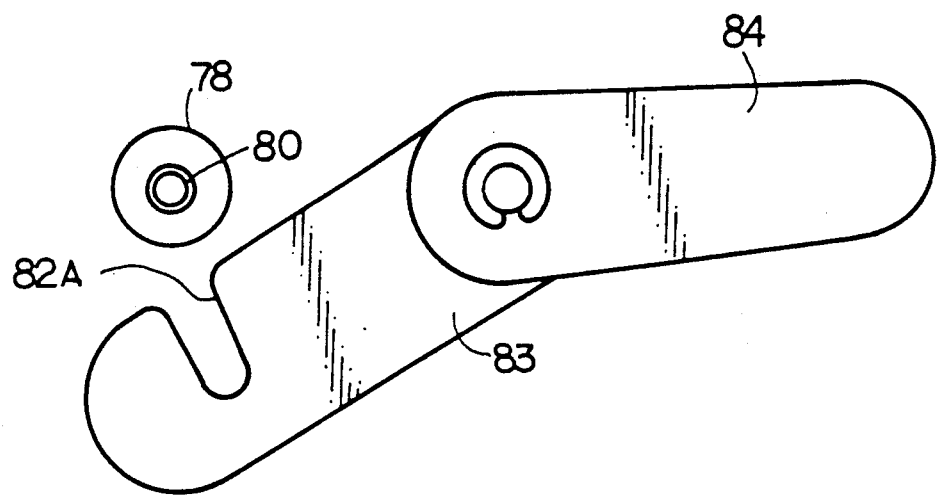
FIG. 17 is a side view illustrating the cancel mechanism shown in FIG. 16.

Further, if a foldable rear seat is provided, a cancel device is provided so that the lock of the back of a seat back cannot be released. One example of a cancel device is shown in FIG. 16. A back of a seat 10 is fixed to the vehicle body such that a pull knob 74 is fitted into an opening 760 defined in a seat back frame 76 and a rod 80 is connected with the knob 74 at one end thereof and further connected with a striker (not shown in the drawings) mounted on the vehicle body at another end thereof. A stopper 82 is provided between the knob 74 and the rod 80. the stopper 82 is located under a guide 78. A lever 83, which has a notch 82A therein, is mounted on the seat back frame 76. Another lever 84 is provided so that the rotational movement of the lever 84 causes the rotational movement of the lever 83. The lever 84 is located within the luggage compartment 12. When the lever 84 is rotated, the lever 83 is rotated to engage with the stopper 82 at the notch 82A. As a result, the knob 74 is locked by the engagement between the stopper 82 and the lever 83. Hence, the knob 74 is locked.

While the present invention has been described in its preferred embodiments, it is to be understood that the invention is not limited thereto, and may be otherwise embodied within the scope of the following claims.

What is claimed is:

1. A vehicle body structure having a luggage compartment located between a back of a seat and a rotatably mounted back door, comprising:
 a package tray provided in the luggage compartment, to conceal luggage located in the luggage compartment, the package tray being positioned between the back of the seat and the back door and the package tray separating the luggage compartment from a passenger compartment when the back door is closed, said package tray having a front edge, a rear edge, a bottom surface and a top surface;
 a bracket for mounting the package tray thereon, said bracket comprising a main portion which is substantially flush with an upper surface of the package tray, and a stepped portion located under the main portion;

7 a first pivot means mounted on said bottom surface of said package tray closer to said front edge than said rear edge, the first pivot means including a fastener fixed on the package tray and a pin fixed on the fastener at one end thereof;

a second pivot means mounted on said bottom surface of said package tray closer to said rear edge than said front edge, wherein when said back door is closed said bottom surface of said rear edge is located adjacent said back door; and a lock means provided between the package tray and the bracket, said lock means located within the luggage compartment on a side of a stepped portion of the bracket, the lock means including a clamp fixed on the stepped portion of the bracket, said lock means adapted to secure said first pivot means, whereby when said lock means secures said first pivot means said package tray is locked to said bracket and said lock means is blocked from the passenger compartment by said package tray thus rendering said luggage compartment inaccessible from said passenger compartment, whereby said pin of the first pivot means is placed in said clamp to lock said package tray.

2. The vehicle body structure of claim 1, wherein said pin of the first pivot means extends outwardly in a lateral direction of the package tray from the fastener, and wherein the clamp of the lock means includes an aperture which corresponds in size to the pin of the first pivot means.

3. The vehicle body structure of claim 2, wherein the lock means further comprises a bias means which contacts the clamp.

4. The vehicle body structure of claim 3, wherein the clamp has two concave portions which the bias means contacts alternatively, whereby when the bias means contacts a first of said two portions said clamp is biased so as to enage with the pin and when the bias means contacts a second of said two portions, said clamp is biased away from said pin.

5. The vehicle body structure of claim 1, wherein the clamp includes an aperture in which the first pivot means is mounted, and the lock means further comprises a slider slidably mounted on the bracket and a bias means for biasing the slider toward the aperture of the clamp.

6. The vehicle body structure of claim 5, wherein the bracket has a guide hole in which the slider is inserted.

7. The vehicle body structure of claim 6, wherein the slider comprises a main portion which closes the aperture of the clamp at a foremost position, and a guide portion which is fitted into the guide hole and which is connected with the bias means.

8. The vehicle body structure of claim 6, wherein the guide hole is L-shaped.

9. The vehicle body of claim 1, wherein the lock means further comprises at least one projection, said projection being mounted on said package tray, and the clamp includes an aperture in which the pin of the first pivot means is mounted, whereby when the package tray is located on the bracket, the projection is positioned under the bracket to prevent the package tray from separating from the bracket.

10. The vehicle body structure of claim 9, wherein said at least one projection comprises a pair of projections, and wherein said package tray includes lateral ends, each projection of said pair of projections being located at a lateral end of the package tray, said pair of projections being connected by a rod.

11. The vehicle body structure of claim 1, wherein the lock means comprises a slider which is mounted within the fastener fixed on the package tray such that the slider may slide to the outside of the fastener, and when the slider projects to the outside of the fastener, a part of the slider is positioned under the bracket to prevent the package tray from being separated from the bracket.

12. The vehicle body structure of claim 11, wherein the slider has a h-shaped form.

13. The vehicle body structure of claim 11, wherein the fastener has a hole in which the slider is fitted and guided when the slider moves and projects to the outside of the fastener.

14. The vehicle body structure of claim 1, further comprising a fixing means which fixes a foldable rear seat onto a vehicle body, and another lock means which interlocks the fixing means to prevent the fixing means from being released from a fixed condition, wherein the another lock means is a lever which has a notch therein, and the lever engages with the fixing means at the notch.

15. The vehicle body structure of claim 1, wherein said back door includes an inner projection, said inner projection being located in the vicinity of the top surface of the rear edge of the package tray when the back door is closed.

16. A vehicle body structure defining a passenger compartment and a luggage compartment, said luggage compartment being located between a back of a rear seat and a back door, the back door being rotatably mounted on an outer portion of the vehicle body structure, said vehicle body structure comprising:

a package tray provided in the luggage compartment to conceal an inside of the luggage compartment, the package tray being positioned between the back of the seat and the back door and the package tray separating the luggage compartment from a passenger compartment when the back door is closed, the package tray including a front edge, a rear edge, a top surface and a bottom surface;

a bracket for mounting the package tray thereon, the bracket being fixed on the vehicle body structure, the bracket being located between the back of the seat and the back door, said bracket comprising a main portion which is substantially flush with an upper surface of the package tray, and a stepped portion located under the main portion;

a first pivot means being mounted on the bottom surface of the package tray, the first pivot means being located closer to said front edge than said rear edge, the first pivot means including a fastener fixed on the package tray and a pin fixed on the fastener at one end thereof;

a second pivot means being mounted on the bottom surface of the package tray, the second pivot means being located closer to said rear edge than said front edge, said rear edge being adjacent to the back door when the back door is closed; and a lock means provided between the bottom surface of the package tray and the bracket, said lock means located within the luggage compartment on a side of a stepped portion of the bracket, the lock means including a clamp fixed on the stepped portion of the bracket, whereby when the lock means locks the package tray to the bracket the lock means is blocked from the passenger compartment by said package tray and when the back door is closed the lock means cannot be manipulated from the passenger compartment, whereby said pin of the first pivot means is placed in said clamp to lock said package tray.

17. A vehicle body structure defining a passenger compartment and a luggage compartment between a back of a rear seat and a back door, the back door being mounted on the vehicle body structure, comprising:
- a package tray provided in the luggage compartment to conceal an inside of the luggage compartment, the package tray being positioned between the back of the seat and the back door and the package tray separating the luggage compartment from a passenger compartment when the back door is closed, the package tray including a front edge, a rear edge, an upper surface and a bottom surface;
- a bracket for mounting the package tray thereon, the bracket being located between the back of the seat and the back door, said bracket comprising a main portion which is substantially flush with an upper surface of the package tray, and a stepped portion located under the main portion;
- a first pivot means being mounted on the bottom surface of the package tray, the first pivot means being located closer to said front edge than said rear edge, the first pivot means including a fastener fixed on the package tray and a pin fixed on the fastener at one end thereof;
- a second pivot means being mounted on the bottom surface of the package tray, the second pivot means being located closer to said rear edge than said front edge, said rear edge being adjacent to the back door when the back door is closed; and
- a lock means provided between the package tray and the bracket, the lock means being located between the first pivot means and the bracket, said lock means located within the luggage compartment on a side of a stepped portion of the bracket, the lock means including a clamp fixed on the stepped portion of the bracket, whereby when the lock means locks the first pivot means with the bracket and the back door is closed, said lock means is blocked from the passenger compartment by said package tray, the back door is positioned adjacent to the top surface of the rear edge of the package tray, whereby the lock means cannot be manipulated from the passenger compartment, whereby said pin of the first pivot means is placed in said clamp to lock said package tray.

* * * * *